(12) United States Patent
Hirose et al.

(10) Patent No.: US 10,147,919 B2
(45) Date of Patent: Dec. 4, 2018

(54) POWER STORAGE APPARATUS

(71) Applicant: KABUSHIKI KAISHA TOYOTA JIDOSHOKKI, Kariya-shi, Aichi-ken (JP)

(72) Inventors: Takayuki Hirose, Kariya (JP); Motoaki Okuda, Kariya (JP); Shinji Suzuki, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 49 days.

(21) Appl. No.: 15/528,834

(22) PCT Filed: Nov. 4, 2015

(86) PCT No.: PCT/JP2015/081061
§ 371 (c)(1),
(2) Date: May 23, 2017

(87) PCT Pub. No.: WO2016/084563
PCT Pub. Date: Jun. 2, 2016

(65) Prior Publication Data
US 2017/0324071 A1 Nov. 9, 2017

(30) Foreign Application Priority Data
Nov. 28, 2014 (JP) ................. 2014-240997

(51) Int. Cl.
*H01M 2/10* (2006.01)
*H01M 10/0585* (2010.01)
(Continued)

(52) U.S. Cl.
CPC .......... *H01M 2/1072* (2013.01); *H01G 11/24* (2013.01); *H01G 11/52* (2013.01);
(Continued)

(58) Field of Classification Search
CPC .......... H01M 2/1072; H01M 10/0585; H01M 10/0525; H01M 2/14
See application file for complete search history.

(56) References Cited

U.S. PATENT DOCUMENTS

2011/0236750 A1   9/2011  Kohno et al.
2012/0160559 A1*  6/2012  Tsutsumi .............. H01M 2/021
                                            174/551
(Continued)

FOREIGN PATENT DOCUMENTS

JP   09-120836 A   5/1997
JP   10-012278 A   1/1998
(Continued)

OTHER PUBLICATIONS

International Preliminary Report on Patentability with a Translation of Written Opinion issued from the International Bureau in counterpart International Application No. PCT/JP2015/081061, dated May 30, 2017.

*Primary Examiner* — Stewart A Fraser
(74) *Attorney, Agent, or Firm* — Sughrue Mion, PLLC (57) ABSTRACT

A power storage apparatus includes an electrode assembly and a case for accommodating the electrode assembly. The power storage apparatus has a covering member that is arranged between the case and the electrode assembly to cover at least part of the electrode assembly. The covering member has an extending portion that extends in the protruding direction of the electrode terminals from one of the edges of the electrode assembly that is opposed to the electrode terminals. The coefficient of friction between the covering member and the electrode assembly is greater than the coefficient of friction between the case and the covering member.

10 Claims, 3 Drawing Sheets

(51) Int. Cl.
*H01G 11/82* (2013.01)
*H01M 2/18* (2006.01)
*H01M 2/14* (2006.01)
*H01G 11/24* (2013.01)
*H01G 11/52* (2013.01)
*H01G 11/74* (2013.01)
*H01G 11/78* (2013.01)
*H01M 10/0525* (2010.01)
*H01M 10/04* (2006.01)

(52) U.S. Cl.
CPC ............. *H01G 11/74* (2013.01); *H01G 11/78* (2013.01); *H01G 11/82* (2013.01); *H01M 2/14* (2013.01); *H01M 2/18* (2013.01); *H01M 10/0525* (2013.01); *H01M 10/0585* (2013.01); *H01M 10/0413* (2013.01); *H01M 2220/20* (2013.01)

(56) References Cited

U.S. PATENT DOCUMENTS

2015/0340663 A1    11/2015    Minagata et al.
2015/0357607 A1*  12/2015    Tsutsumi .............. H01M 2/021
                                                      429/177

FOREIGN PATENT DOCUMENTS

| JP | 2011-198663 A | 10/2011 |
| --- | --- | --- |
| JP | 2013-164903 A | 8/2013 |
| JP | 2014-041724 A | 3/2014 |
| JP | 2015-153690 A | 8/2015 |
| WO | 2014/002647 A1 | 1/2014 |

\* cited by examiner

POWER STORAGE APPARATUS

CROSS REFERENCE TO RELATED APPLICATIONS

This is a National Stage of International Application No. PCT/JP2015/081061 filed Nov. 4, 2015, claiming priority based on Japanese Patent Application No. 2014-240997 filed Nov. 28, 2014, the contents of all of which are incorporated herein by reference in their entirety.

TECHNICAL FIELD

The present invention relates to a power storage apparatus.

BACKGROUND ART

Conventionally, vehicles such as electric vehicles (EV) and plug-in hybrid vehicles (PHV) are equipped with power storage apparatuses such as lithium-ion rechargeable batteries and nickel metal hydride rechargeable batteries. Power storage apparatuses store electricity supplied to in-vehicle devices such as electric motors. Such a power storage apparatus includes an electrode assembly in which electrodes are stacked and layered. The electrode assembly is wrapped with a push-in guide plate when inserted in a case. Refer, for example, to Patent Document 1. Accordingly, the power storage apparatus of Patent Document 1 facilitates insertion of the electrode assembly into the case.

PRIOR ART DOCUMENT

Patent Document

Patent Document 1: Japanese Laid-Open Patent Publication No. 9-120836

SUMMARY OF THE INVENTION

Problems that the Invention is to Solve

However, in the power storage apparatus of Patent Document 1, no special consideration is given to restraint on movement of the electrode assembly relative to the push-in guide plate. Therefore, it may be difficult to maintain the position of the electrode assembly in the case.

It is an objective of the present invention to provide a power storage apparatus capable of restraining movement of the electrode assembly in the case.

Means for Solving the Problems

To achieve the foregoing objective and in accordance with one aspect of the present invention, a power storage apparatus is provided that includes an electrode assembly having a plurality of stacked and layered electrodes, a case that accommodates the electrode assembly, an electrode terminal that protrudes from the case and is electrically connected to the electrode assembly, and a covering member that is arranged between the case and the electrode assembly and covers at least part of the electrode assembly. The covering member includes an extending portion that extends in a protruding direction of the electrode terminal from one of edges of the electrode assembly that is opposed to the electrode terminal. A coefficient of friction between the covering member and the electrode assembly is greater than a coefficient of friction between the case and the covering member.

In this configuration, the coefficient of friction between the covering member and the electrode assembly is greater than the coefficient of friction between the case and the covering member. This restrains the electrode assembly from moving relative to the covering member, while facilitating insertion of the electrode assembly into the case. In addition, since the covering member has the extending portion that extends from the edge of the electrode assembly toward the electrode terminal, it is possible to restrain the electrode assembly from moving toward the electrode terminal together with the covering member. This restrains movement of the electrode assembly in the case.

In the above described power storage apparatus, the covering member preferably includes an inner surface that is in contact with the electrode assembly and an outer surface that is in contact with the case. The inner surface of the covering member is preferably a rough surface, and the outer surface of the covering member is preferably a smooth surface.

This facilitates insertion of the electrode assembly into the case. This also restrains the electrode assembly from moving relative to the covering member.

In the above described power storage apparatus, the electrode assembly preferably has an outer surface that is in contact with the covering member, and the outer surface of the electrode assembly is preferably rougher than the inner surface of the case.

This restrains the electrode assembly from moving relative to the covering member.

In the above described power storage apparatus, the electrode assembly preferably includes a thickness adjuster that is in contact with the covering member at an outermost layer of the electrode assembly.

With this configuration, even if the thickness of the electrode assembly varies, the thickness of the electrode assembly can be adjusted so that the electrode assembly and the covering member contact each other. This further restrains movement of the electrode assembly in the case.

In the above described power storage apparatus, the thickness adjuster preferably has an outer surface that is in contact with the covering member. The outer surface of the thickness adjuster is preferably a rough surface. The covering member preferably has an outer surface that is in contact with the case, and the outer surface of the covering member is preferably a smooth surface.

With this configuration, even in the case where the electrode assembly is provided with a thickness adjuster, the coefficient of friction between the case and the covering member can be easily reduced while increasing the coefficient of friction between the covering member and the electrode assembly.

In the above described power storage apparatus, the electrode assembly and the covering member are preferably in surface contact with each other. Since the electrode assembly and the covering member are in surface contact, the electrode assembly is restrained from moving relative to the covering member over a wide range. This further restrains movement of the electrode assembly in the case.

In the above described power storage apparatus, the covering member is preferably in a shape of a bag, and the covering member preferably accommodates the electrode assembly. Since the covering member is in the shape of a bag accommodating the electrode assembly, the electrode assembly and the covering member easily contact each other. This further restrains the electrode assembly from moving relative to the covering member.

In the above described power storage apparatus, the covering member is preferably an insulating film that insulates the electrode assembly and the case from each other. This insulates the electrode assembly from the case and restrains such insulation from being difficult due to relative movement of the electrode assembly relative to the covering member.

In the above described power storage apparatus, the electrode assembly preferably includes a bundle of tabs. The tab bundle is preferably connected to the electrode terminal. By being bent, the tab bundle preferably allows the electrode assembly to move toward the electrode terminal.

With this configuration, even if the electrode assembly moves toward the electrode terminal, the load can be absorbed by bending of the tab bundle.

In the above described power storage apparatus, the power storage apparatus is preferably a rechargeable battery. This restrains movement of the electrode assembly in the case of the rechargeable battery.

Effects of the Invention

The present invention restrains movement of the electrode assembly in the case.

MODES FOR CARRYING OUT THE INVENTION

A rechargeable battery according to one embodiment will now be described.

Figure 1:
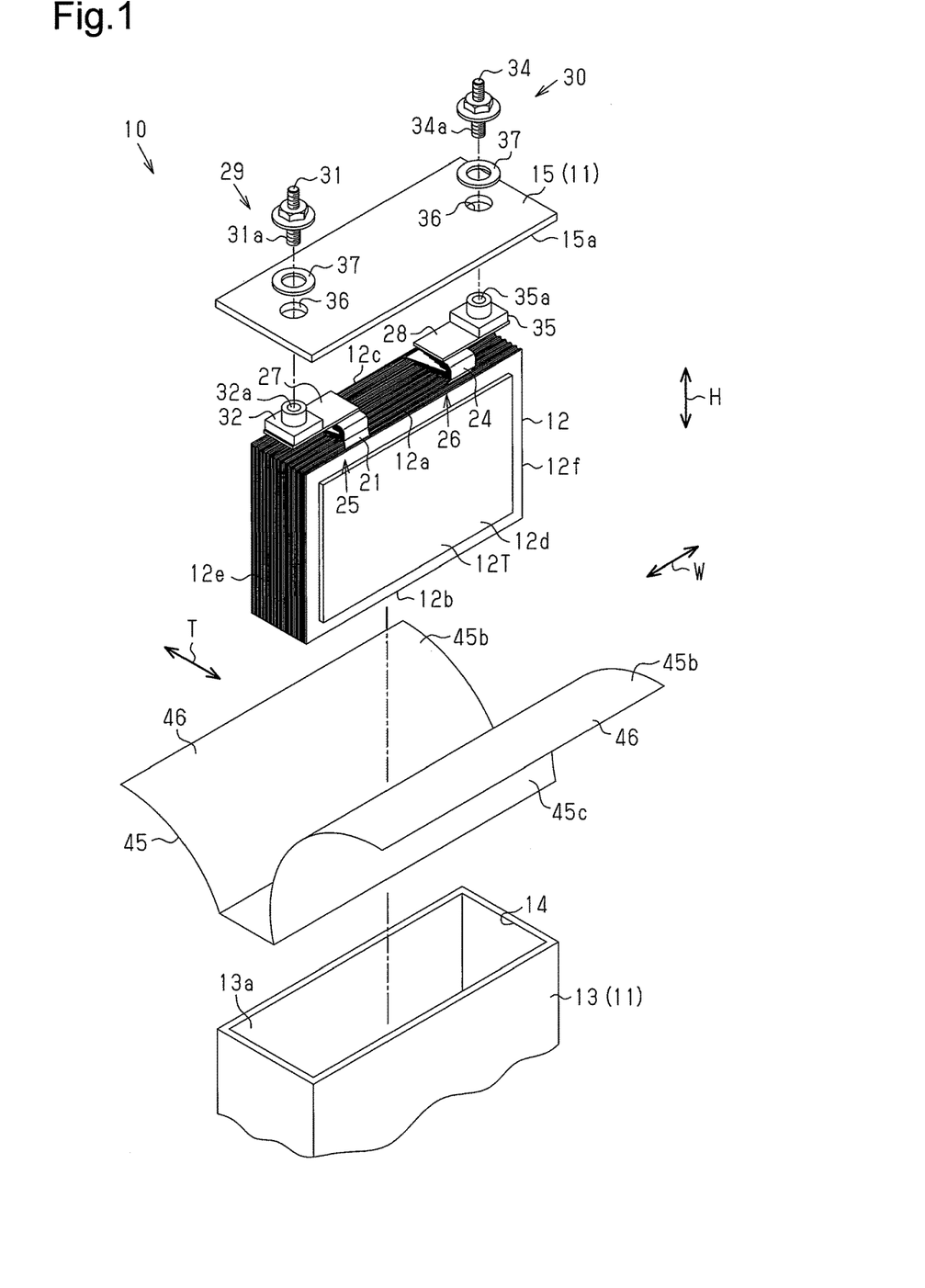
FIG. 1 is an exploded perspective view of a rechargeable battery.

As shown in FIG. 1, a rechargeable battery 10, which is a power storage apparatus, is a rectangular lithium-ion battery having a rectangular outer shape. The rechargeable battery 10 includes a case 11 and an electrode assembly 12 accommodated in the case 11. The case 11 includes a case body 13 and a rectangular plate-shaped lid 15. The case body 13 is shaped as a rectangular tube with an opening 14 and a closed end, and the lid 15 closes the opening 14 of the case body 13. The case body 13 and the lid 15 are made of metal, such as stainless steel or aluminum. The case 11 contains electrolytic solution, which is an electrolyte (not shown).

Figure 2:
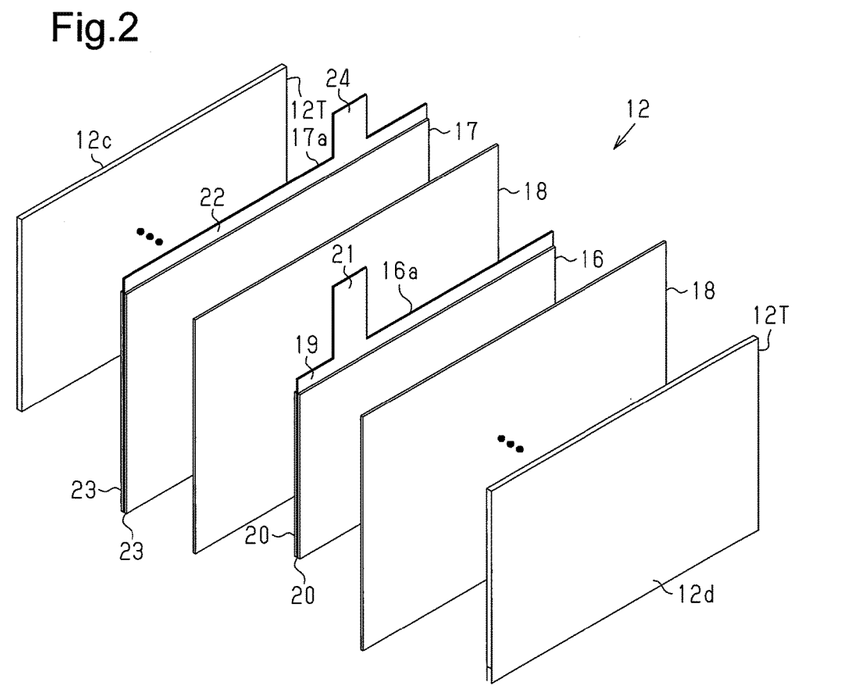
FIG. 2 is an exploded perspective view of the electrode assembly.

As shown in FIG. 2, the electrode assembly 12 has electrodes, which include positive electrodes 16 and negative electrodes 17, and porous separators 18 insulating the electrodes 16, 17 from each other. The electrode assembly 12 has a lamination structure in which the positive electrodes 16 and the negative electrodes 17 are alternately laminated with the separators 18 in between.

As shown in FIG. 1, the electrode assembly 12 has a substantially rectangular parallelepiped shape as a whole. The electrode assembly 12 has an upper surface 12a and a lower surface 12b. When the electrode assembly 12 is stored in the case 11, the upper surface 12a faces an inner surface 15a of the lid 15, and the lower surface 12b faces an inner surface 13a of the case body 13 at the bottom. Further, the electrode assembly 12 has side surfaces 12c, 12d, 12e, 12f, which are connected to the upper and lower surfaces 12a, 12b. The side surfaces 12c, 12d are arranged at the opposite ends in a lamination direction T of the electrode assembly 12. The side surfaces 12c, 12d, 12e, 12f are opposed to side walls of the case 11 in a state where the electrode assembly 12 is accommodated in the case 11.

As shown in FIG. 2, each positive electrode 16 includes a positive-electrode foil 19 made of, for example, aluminum, positive-electrode active material layers 20 covering the positive-electrode foil 19, and a positive-electrode collector tab 21. The positive-electrode collector tab 21 protrudes in a plane direction of the positive-electrode foil 19 from an edge 16a of the positive-electrode foil 19. The positive-electrode active material layers 20 are provided by applying positive-electrode active material on both surfaces of the positive-electrode foil 19. The positive-electrode collector tab 21 is an uncoated portion of the positive-electrode foil 19, to which the positive-electrode active material is not applied.

Each negative electrode 17 has a negative-electrode foil 22, negative-electrode active material layers 23 covering the negative-electrode foil 22, and a negative-electrode collector tab 24 protruding from an edge 17a of the negative-electrode foil 22. The negative-electrode active material layers 23 are provided by applying negative-electrode active material on both surfaces of the negative-electrode foil 22. The negative-electrode collector tab 24 is an uncoated portion of the negative-electrode foil 22 to which the negative-electrode active material is not applied. In the electrode assembly 12, each negative-electrode active material layer 23 has a size capable of covering the entire surface of the positive-electrode active material layer 20 when viewed from the lamination direction T.

As shown in FIG. 1, the electrode assembly 12 has a positive-electrode collector tab bundle 25, which protrudes from the upper surface 12a and is formed by stacking and layering the positive-electrode collector tabs 21. The positive-electrode collector tab bundle 25 is provided by stacking the positive electrodes 16 in the electrode assembly 12 such that the positive-electrode collector tabs 21 are arranged in a row in the lamination direction T. The electrode assembly 12 also has a negative-electrode collector tab bundle 26, which protrudes from the upper surface 12a and is formed by stacking and layering the negative-electrode collector tabs 24. The negative-electrode collector tab bundle 26 is provided by stacking the negative electrodes 17 in the electrode assembly 12 such that the negative-electrode collector tabs 24 are arranged in a row in the lamination direction T.

A positive-electrode conductor 27, which is substantially shaped as a rectangular plate, is connected to the positive-electrode collector tab bundle 25. A positive terminal 29, which is an electrode terminal for exchanging electricity with the electrode assembly 12, is connected to the positive-electrode conductor 27. That is, the positive-electrode conductor 27 electrically connects the positive-electrode collector tab bundle 25 and the positive terminal 29 to each other. A negative-electrode conductor 28, which is substantially shaped as a rectangular plate, is connected to the negative-electrode collector tab bundle 26. A negative terminal 30, which is an electrode terminal for exchanging electricity with the electrode assembly 12, is connected to the negative-electrode conductor 28. That is, the negative-electrode conductor 28 electrically connects the negative-electrode collector tab bundle 26 and the negative terminal 30 to each other.

The positive terminal 29 has a positive terminal portion 31, which has a first end protruding to the outside of the case 11, and a positive terminal base 32 arranged inside the case 11. The positive terminal base 32 and the positive-electrode conductor 27 are connected to each other. The positive terminal portion 31 has an external thread portion 31a, which is provided at a second end opposite to the first end. The positive terminal base 32 has an internal thread portion 32a. The external thread portion 31a is passed through a through-hole 36 in the lid 15 and threaded to the internal thread portion 32a so that the positive terminal portion 31 and the positive terminal base 32 are integrated. The positive terminal 29 has an insulating ring 37 that insulates the positive terminal 29 and the case 11 from each other.

The negative terminal 30 has a negative terminal portion 34, which has a first end protruding to the outside of the case 11, and a negative terminal base 35 arranged inside the case 11. The negative terminal base 35 and the negative-electrode conductor 28 are connected to each other. The negative terminal portion 34 has an external thread portion 34a, which is provided at a second end opposite to the first end. The negative terminal base 35 has an internal thread portion 35a. The external thread portion 34a is passed through a through-hole 36 in the lid 15 and threaded to the internal thread portion 35a so that the negative terminal portion 34 and the negative terminal base 35 are integrated. The negative terminal 30 has an insulating ring 37 that insulates the negative terminal 30 and the case 11 from each other.

In addition, the electrode assembly 12 has thickness adjusting sheets 12T as thickness adjusters for adjusting the dimension of the electrode assembly 12 in the lamination direction T (thickness). The thickness adjusting sheets 12T are each provided at one of the opposite ends of the electrode assembly 12 in the lamination direction T. That is, the thickness adjusting sheets 12T are arranged along a direction orthogonal to the lamination direction T. The thickness adjusting sheets 12T are quadrangular film-shaped members made of plastic such as polypropylene and fixed to the respective electrodes 16 and 17 constituting the electrode assembly 12 with fixing members such as holding tapes. In the electrode assembly 12, each thickness adjusting sheet 12T has a size capable of covering the entire surfaces of the positive-electrode active material layer 20 and the negative-electrode active material layer 23 when viewed from the lamination direction T. Both sides of each thickness adjusting sheet 12T are rough surfaces. The outer surfaces of the thickness adjusting sheets 12T, each of which faces a side wall of the case 11, are side surfaces 12c, 12d.

Figure 3:
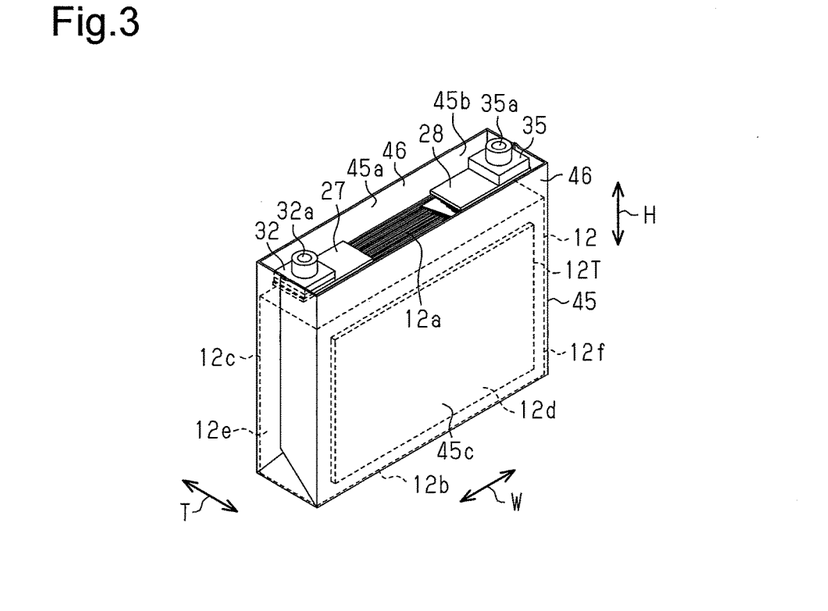
FIG. 3 is a perspective view of the electrode assembly accommodated in a covering member.

As shown in FIGS. 1 and 3, the rechargeable battery 10 includes a covering member 45, which is arranged between the case 11 and the electrode assembly 12 and covers at least part of the electrode assembly 12. The covering member 45 is made of insulating plastic material such as polypropylene and is an insulating film (sheet) that insulates the case 11 and the electrode assembly 12 from each other. In addition, the covering member 45 is in the shape of a bag shaped as a rectangular tube with a closed end and has an opening 45a for receiving the electrode assembly 12. That is, the electrode assembly 12 is accommodated in the case body 13 in a state of being accommodated in the covering member 45. Each of the thickness adjusting sheets 12T, which constitute the electrode assembly 12, is in contact (surface contact) with the covering member 45 over the entirety of the surface opposed to an inner surface 45b of the covering member 45 at the outermost layer of the electrode assembly 12. The side surfaces 12e and 12f of the electrode assembly 12 are in contact with the inner surface 45b of the covering member 45.

The covering member 45 of the present embodiment is formed by folding a rectangular film having a size capable of covering five sides of the electrode assembly 12, or the surfaces 12b to 12f except the upper surface 12a, to form a rectangular tube with a closed end. The dimension of the covering member 45 in the protruding direction of the terminals 29 and 30 (hereinafter referred to as a height direction H) is longer than the dimension of the electrode assembly 12 in the height direction H from the lower surface 12b to the upper surface 12a. That is, the covering member 45 includes an extending portion 46, which extends in the protruding direction of the terminals 29, 30 from one of the edges of the electrode assembly 12 that is opposed to the terminals 29, 30. Specifically, the extending portion 46 extends from the upper surface 12a of the electrode assembly 12. In other words, among the edges of the electrode assembly 12, the extending portion 46 extends in the protruding direction of the terminals 29, 30 from the upper surface 12a, which has the tab bundles 25, 26, that is, from the upper surface 12a, which is connected to the terminals 29, 30. The extending portion 46 has a shape of a rectangular tube that extends upward beyond the upper surface 12a of the electrode assembly 12 in the height direction H.

The dimension of the covering member 45 in the height direction H is the same (approximately the same) as or slightly shorter than the dimension of the case body 13 from the inner surface 13a of the case body 13 at the bottom to the inner surface 15a of the lid 15. Therefore, in the present embodiment, the conductors 27, 28 and the terminal bases 32, 35 are covered by the covering member 45 when viewed from the lamination direction T.

When accommodating the electrode assembly 12, the dimension of the covering member 45 in the lamination direction T is the same (substantially the same) as or slightly shorter than the distance between the inner surfaces 13a, 13a of the side walls located at the opposite ends of the case 11 in the lamination direction T. Also, when accommodating the electrode assembly 12, the dimension of the covering member 45 in the width direction W, which is orthogonal to the height direction H and the lamination direction T, is the same (substantially the same) as or slightly shorter than the distance between the inner surfaces 13a, 13a of the side walls located at the opposite ends of the case 11 in the width direction W.

In the rechargeable battery 10 of the present embodiment, the side surfaces 12c, 12d (the thickness adjusting sheets 12T) of the electrode assembly 12 are rough surfaces, while the inner surfaces 13a of the case body 13, the inner surface 45b of the covering member 45, and the outer surface 45c of the covering member 45 are smooth surfaces. That is, the surface roughness of the side surfaces 12c, 12d (the thickness adjusting sheets 12T) of the electrode assembly 12 (the arithmetic average roughness Ra in the present embodiment) is greater than those of the inner surfaces 13a of the case body 13, the inner surface 45b of the covering member 45, and the outer surface 45c of the covering member 45. Therefore, in the present embodiment, the coefficient of friction μ1 between the inner surfaces 13a of the case 11 and the outer surface 45c of the covering member 45 is smaller than the coefficient of friction μ2 between the inner surface 45b of the covering member 45 and the side surfaces 12c, 12d (the thickness adjusting sheets 12T) of the electrode assembly 12.

The methods of making the thickness adjusting sheets 12T to have rough surfaces include a method of manufacturing the sheets 12T to have rough surfaces at the time of manufacturing, a method of using a material that can be easily made rough, a method of forming rough surfaces by treatment such as etching, and a method of forming rough surfaces by a mechanical method. Similarly, the methods of making the inner surface 45b and the outer surface 45c of the covering member 45 to be smooth include known methods for smoothing surfaces.

In the present embodiment, the electrode assembly 12 is accommodated in the case 11 with the collector tab bundles 25, 26 folded. Therefore, even if the collector tab bundles 25, 26 are bent so that the electrode assembly 12 moves in the height direction H, the collector tab bundles 25, 26 permit such movement.

Operation of the present embodiment will now be described.

In the present embodiment, the coefficient of friction $\mu 2$ between the covering member 45 and the electrode assembly 12 (the thickness adjusting sheets 12T) is greater than the coefficient of friction $\mu 1$ between the case 11 and the covering member 45. Therefore, the present embodiment restrains the electrode assembly 12 from moving relative to the covering member 45 while facilitating insertion of the electrode assembly 12 into the case body 13. Further, in the present embodiment, since the covering member 45 has the extending portion 46 extending from the upper surface 12a of the electrode assembly 12 in the protruding direction of the terminals 29, 30, the covering member 45 is restrained from moving in the protruding direction of the terminals 29, 30. That is, the present embodiment restrains the electrode assembly 12 from moving toward the terminals 29, 30 together with the covering member 45.

Particularly, the dimension of the covering member 45 in the height direction H is the same (approximately the same) as or slightly shorter than the dimension of the case 11 from the inner surface 13a of the bottom to the inner surface 15a of the lid 15. This further restrains the electrode assembly 12 from moving in the height direction H together with the covering member 45.

When accommodating the electrode assembly 12, the dimension of the covering member 45 in the width direction W is the same (substantially the same) as or slightly shorter than the distance between the inner surfaces 13a, 13a of the side walls located at the opposite ends of the case 11 in the width direction W. This restrains the electrode assembly 12 from moving in the width direction W together with the covering member 45.

When accommodating the electrode assembly 12, the dimension of the covering member 45 in the lamination direction T is the same (substantially the same) as or slightly shorter than the distance between the inner surfaces 13a, 13a of the side walls located at the opposite ends of the case 11 in the lamination direction T. Therefore, the present embodiment binds the electrode assembly 12 and the covering member 45 via the case 11 by applying a load in the lamination direction T, for example, to the rechargeable battery 10. In this state, since the electrode assembly 12 and the covering member 45 are in close contact with each other, the electrode assembly 12 is further restrained from moving within the covering member 45.

Accordingly, the present embodiment achieves the following advantages.

(1) The coefficient of friction $\mu 2$ between the covering member 45 and the electrode assembly 12 is greater than the coefficient of friction $\mu 1$ between the case 11 and the covering member 45, and the covering member 45 has the extending portion 46. This restrains movement of the electrode assembly 12 in the case 11.

(2) The electrode assembly 12 has the thickness adjusting sheets 12T, which are in contact with the covering member 45 at the outermost layers. Thus, even if the thickness of the electrode assembly 12 varies, the thickness of the electrode assembly 12 can be adjusted so that the electrode assembly 12 and the covering member 45 contact each other. This restrains movement of the electrode assembly 12 in the case 11.

(3) At least the outer surface (side surfaces 12c, 12d) of the thickness adjusting sheet 12T is a rough surface, and at least the outer surface 45c of the covering member 45 is a smooth surface. Thus, even though the electrode assembly 12 is provided with the thickness adjusting sheets 12T, the coefficient of friction $\mu 1$ between the case 11 and the covering member 45 can be easily reduced while increasing the coefficient of friction $\mu 2$ between the covering member 45 and the electrode assembly 12.

(4) Since the electrode assembly 12 and the covering member 45 are in surface contact with each other, the electrode assembly 12 is restrained from moving relative to the covering member 45 in a wide range. This restrains movement of the electrode assembly 12 in the case 11.

(5) Since the covering member 45 is in the shape of a bag accommodating the electrode assembly 12, the electrode assembly 12 and the covering member 45 contact each other easily. This further restrains the electrode assembly 12 from moving relative to the covering member 45.

(6) The covering member 45 is an insulating film that insulates the electrode assembly 12 and the case 11 from each other. This insulates the electrode assembly 12 from the case 11 and restrains such insulation from being difficult due to relative movement of the electrode assembly 12 relative to the covering member 45.

(7) The rechargeable battery 10 restrains movement of the electrode assembly 12 in the case 11.

(8) Since the electrode assembly 12 is restrained from moving relative to the covering member 45, the electrode assembly 12 is restrained from contacting the conductors 27, 28, for example. In addition, it is possible to restrain a load from being applied to the joint portion between the positive-electrode collector tab bundle 25 and the positive-electrode conductor 27 and to the joint portion between the negative-electrode collector tab bundle 26 and the negative-electrode conductor 28.

(9) Even if the electrode assembly 12 moves toward the terminals 29, 30, the load can be absorbed by bending motion of the collector tab bundles 25, 26.

The above illustrated embodiment may be modified as follows.

Figure 4:
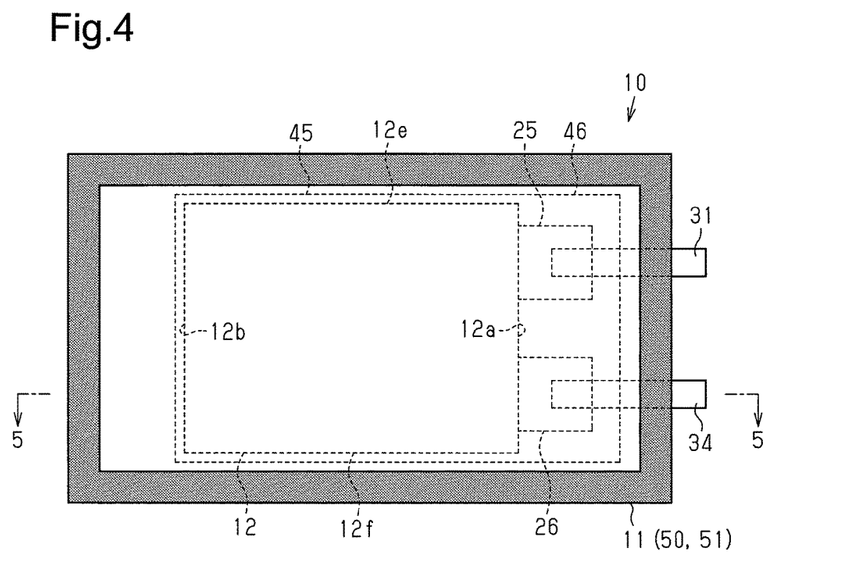
FIG. 4 is a plan view of a rechargeable battery according to another embodiment.
Figure 5:
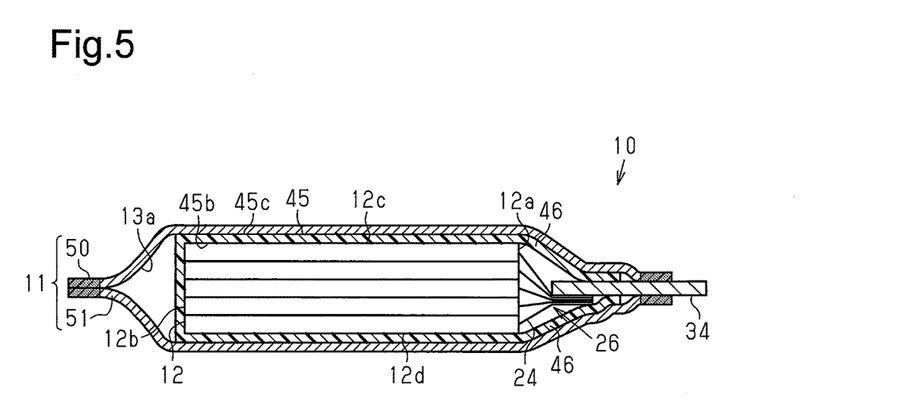
FIG. 5 is a cross-sectional view taken along line 5-5 in FIG. 4.

As shown in FIGS. 4 and 5, the rechargeable battery 10 may be a laminate battery. The case 11 includes laminate members 50, 51. For example, the laminate members 50, 51 each have metal layers of aluminum or the like and plastic layers. As indicated by the gray areas in FIGS. 4 and 5, the case 11 is formed to be in the shape of a bag shape by joining the edges of the laminate members 50 and 51 to each other. In this modification also, the covering member 45 preferably includes an extending portion 46.

The configuration of the case 11, the electrode assembly 12, and the covering member 45 may be changed as necessary as long as the following relational expression is satisfied: Coefficient of friction $\mu 1$ < Coefficient of friction $\mu 2$. For example, the surface roughness of the inner surface 45b of the covering member 45 may be greater than those of the side surfaces 12c, 12d of the electrode assembly 12, the inner surface 13a of the case body 13, and the outer surface 45c of the covering member 45. That is, for example, the inner surface 45b of the covering member 45 may be a rough surface as long as at least the outer surface 45c, which is in contact with the case 11, is a smooth surface. In addition, the inner surface 45b of the covering member 45, the outer surface 45c of the covering member 45, and the inner surfaces 13a of the case body 13 do not necessarily need to be smooth. Further, the thickness adjusting sheets 12T may be made of, for example, a material having adhesiveness. Also, a sheet made of an adhesive material may be provided on the inner surface 45b of the covering member 45. Lubricant may be provided between the case 11 and the covering member 45 to reduce the coefficient of friction $\mu 1$. For example, each thickness adjusting sheet 12T may have a rough surface at least on the surface (the side surfaces 12c, 12d) in contact with the covering member 45, and the opposite surface may be a smooth surface.

In the electrode assembly 12, one or both of the thickness adjusting sheets 12T at the opposite ends in the lamination direction T may be omitted. That is, the outermost layers of the electrode assembly 12 may be any of the separators 18, the positive-electrode foils 19, the negative-electrode foils 22, and the negative-electrode active material layers 23.

The covering member 45 does not necessarily need to be in the shape of a bag. For example, the covering member 45 may be in the shape of a sheet larger than the electrode assembly 12 when viewed from the lamination direction T. That is, the covering member 45 may be modified as long as it covers at least part of the electrode assembly 12. The covering member 45 may be made of a material that can be used as the separators 18.

As long as the covering member 45 includes the extending portion 46, the dimension of the covering member 45 in the height direction H may be smaller than the dimension from the inner surface 13a of the case body 13 at the bottom to the inner surface 15a of the lid 15. Also, the extending portion 46 does not necessarily need to extend in a tubular shape, but may extend partially.

The thickness adjusting sheets 12T may each be in contact with part of the surface (side surfaces 12c, 12d) opposed to the inner surface 45b of the covering member 45.

In the electrode assembly 12, the thickness adjusting sheets 12T may be smaller than the positive-electrode active material layer 20 and the negative-electrode active material layer 23 when viewed from the lamination direction T. Further, two or more thickness adjusting sheets 12T may be arranged side by side on each end face of the electrode assembly 12 in the lamination direction T.

The covering member 45 may be made of a material having conductivity. In this case, the inner surface and the outer surface of the covering member 45 may be covered with insulating layers. Alternatively, the inner surfaces 13a and 15a of the case 11 may be covered with insulating layers.

The electrode assembly 12 may be a spiral type in which a strip-shaped positive electrode and a strip-shaped negative electrode are wound about a winding axis into lamination together with a strip-shaped separator in between. In this case, the electrode assembly 12 may be accommodated in the case 11 with the extending direction of the winding axis aligned with the height direction H. Alternatively, the electrode assembly 12 may be accommodated in the case 11 with the extending direction of the winding axis being orthogonal to the height direction H.

The number of the members constituting the case 11 may be three or more, and the shape of each member may be changed. For example, the case 11 may be formed by combining a first member having an opening and a second member having an opening such that the openings are opposed to each other.

The shape of the case 11 may be changed in accordance with the shape of the accommodated electrode assembly 12 as necessary. For example, the case 11 may have a columnar shape. In this case, it is preferable to use a cylindrical case body 13 with a closed end and a disc-shaped lid 15.

The rechargeable battery 10 may be mounted on a vehicle such as a passenger car or an industrial vehicle or may be employed as a stationary power storage apparatus.

The rechargeable battery 10 is not limited to a lithium-ion rechargeable battery, but may be other types of rechargeable battery such as a nickel metal hydride rechargeable battery and a nickel-cadmium rechargeable battery.

The storage battery of the present invention is not limited to a rechargeable battery but may be a capacitor such as an electric double-layer capacitor or a lithium-ion capacitor.

DESCRIPTION OF THE REFERENCE NUMERALS

10 . . . Rechargeable Battery (Power storage apparatus), 11 . . . Case, 12 . . . Electrode Assembly, 12a . . . Upper Surface (Edge), 12T . . . Thickness Adjusting Sheet (Thickness Adjuster), 16 . . . Positive Electrode (Electrode), 17 . . . Negative Electrode (Electrode), 27 . . . Positive-Electrode Conductor (Conductor), 28 . . . Negative-Electrode Conductor (Conductor), 29 . . . Positive Terminal (Electrode Terminal), 30 . . . Negative Terminal (Electrode Terminal), 45 . . . Covering Member, 46 . . . Extending Portion

The invention claimed is:
1. A power storage apparatus comprising:
an electrode assembly having a plurality of stacked and layered electrodes;
a case that accommodates the electrode assembly;
an electrode terminal that protrudes from the case and is electrically connected to the electrode assembly; and
a covering member that is arranged between the case and the electrode assembly and covers at least part of the electrode assembly, wherein
the covering member includes an extending portion that extends in a protruding direction of the electrode terminal from one of edges of the electrode assembly that is opposed to the electrode terminal,
a coefficient of friction between the covering member and the electrode assembly is greater than a coefficient of friction between the case and the covering member
the electrode assembly has an outer surface that is in contact with the covering member, and
the outer surface of the electrode assembly is rougher than the inner surface of the case.
2. The power storage apparatus according to claim 1, wherein
the covering member includes
an inner surface that is in contact with the electrode assembly, and
an outer surface that is in contact with the case,
the inner surface of the covering member is a rough surface, and
the outer surface of the covering member is a smooth surface.

3. The power storage apparatus according to claim 1, wherein the electrode assembly and the covering member are in surface contact with each other.

4. The power storage apparatus according to claim 1, wherein
the covering member is in a shape of a bag, and
the covering member accommodates the electrode assembly.

5. The power storage apparatus according to claim 1, wherein the covering member is an insulating film that insulates the electrode assembly and the case from each other.

6. The power storage apparatus according to claim 1, wherein
the electrode assembly includes a bundle of tabs,
the tab bundle is connected to the electrode terminal, and
by being bent, the tab bundle allows the electrode assembly to move toward the electrode terminal.

7. The power storage apparatus according to claim 1, wherein the power storage apparatus is a rechargeable battery.

8. The power storage apparatus according to claim 1, wherein the electrode assembly has a lamination structure in which a sheet-shaped positive electrode and a sheet-shaped negative electrode are laminated with a sheet-shaped separator in between.

9. A power storage apparatus comprising:
an electrode assembly having a plurality of stacked and layered electrodes;
a case that accommodates the electrode assembly;
an electrode terminal that protrudes from the case and is electrically connected to the electrode assembly; and
a covering member that is arranged between the case and the electrode assembly and covers at least part of the electrode assembly, wherein
the covering member includes an extending portion that extends in a protruding direction of the electrode terminal from one of edges of the electrode assembly that is opposed to the electrode terminal,
a coefficient of friction between the covering member and the electrode assembly is greater than a coefficient of friction between the case and the covering member,
the electrode assembly includes a thickness adjuster that is in contact with the covering member at an outermost layer of the electrode assembly,
the thickness adjuster has an outer surface that is in contact with the covering member,
the outer surface of the thickness adjuster is a rough surface,
the covering member has an outer surface that is in contact with the case, and
the outer surface of the covering member is a smooth surface.

10. A power storage apparatus comprising:
an electrode assembly having a plurality of stacked and layered electrodes;
a case that accommodates the electrode assembly;
an electrode terminal that protrudes from the case and is electrically connected to the electrode assembly; and
a covering member that is arranged between the case and the electrode assembly and covers at least part of the electrode assembly, wherein
the covering member includes an extending portion that extends in a protruding direction of the electrode terminal from one of edges of the electrode assembly that is opposed to the electrode terminal,
a coefficient of friction between the covering member and the electrode assembly is greater than a coefficient of friction between the case and the covering member,
the covering member includes an inner surface that is in contact with the electrode assembly, and
the inner surface of the covering member is a flat and rough surface.

* * * * *